June 24, 1930.  A. WINKLER ET AL  1,766,967
APPARATUS FOR UNPOWDERING SUGAR BODIES
Filed Nov. 21, 1929
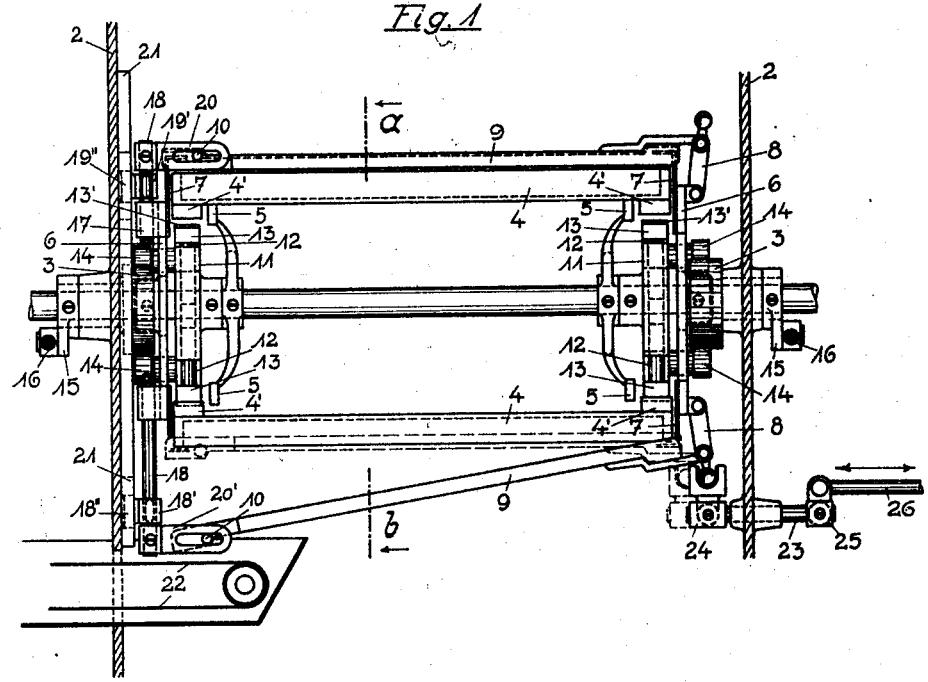
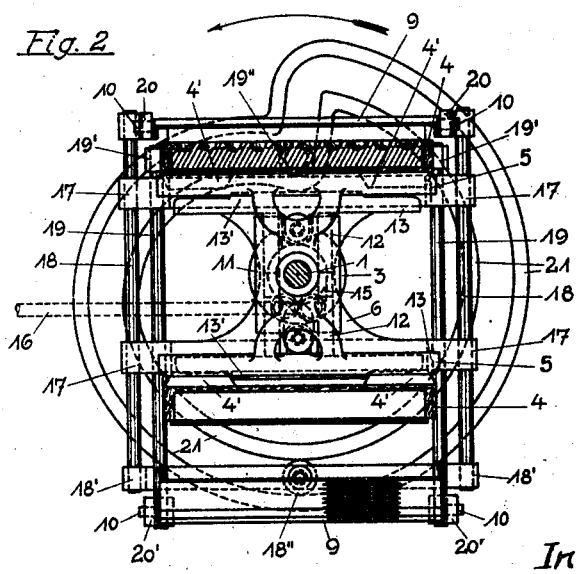
Inventors
Alfred Winkler and
Max Dünnebier
per W. Wallace White
Attorney.

Patented June 24, 1930

1,766,967

UNITED STATES PATENT OFFICE.

ALFRED WINKLER AND MAX DÜNNEBIER, OF NEUWIED, GERMANY

APPARATUS FOR UNPOWDERING SUGAR BODIES

Application filed November 21, 1929, Serial No. 408,918, and in Germany April 9, 1929.

The present invention relates to an improvement in or development of the apparatus described in our German Patent No. 402,122, in which boxes or molds containing powder and the sugar bodies cast therein are turned over for the purpose of discharging their contents.

In the apparatus according to the said German patent a closure flap closes the filled box which is turned without interruption through 360° and the flap is opened after the said box has been turned through about 180°, the said flap serving as a stationary slide over which the contents of the box pass on to a jolting sieve which is located beneath the turning mechanism and upon which a separation of the powder from the sugar bodies is effected. Although the said apparatus was an improvement upon those previously employed for the purpose, a not inconsiderable number of sugar bodies are still broken, particularly when dealing with specially fragile bodies, for example, with those having a liquid filling or the like. This is to be attributed mainly to the fact that the height of fall of the bodies from the edge of the closure flap on to the jolting sieve must still be too great in order to permit the further uninterrupted movement of the box without damage to the bodies already resting upon the jolting sieve.

This drawback is remedied in accordance with the present invention by an arrangement in which the flap, after it has opened, in the inverted position of the box, is moved after the manner of a jolting slide, so that the sugar bodies slide therefrom without being allowed to fall and are received upon a conveyor device which conveys them out of the machine. The closure flap itself consists of a perforated sheet metal plate so that the powder is permitted, for the most part, to drop through the flap and collect in the lower portion of the machine, from which point it is again brought to the filling-point of the boxes. The remaining portion of the powder, together with the sugar bodies, are received upon the conveyor device, which is likewise constructed after the manner of a sieve, so that the powder is there separated completely from the bodies, and passes to the said powder collection point in the lower portion of the machine.

Whereas in the well-known turning apparatus the filled box introduced at any particular time executed a full turn through 360°, the arrangement in accordance with the present invention is such that two powder boxes are accommodated in the turning device. At each operation the device is turned only to the extent of 180°, and the box that is situated at the bottom is emptied while the previously emptied box is removed from the top of the device and a newly filled box is substituted.

The drawing illustrates by way of example one form of embodiment of the invention.

Fig. 1 is a view of the turning apparatus viewed in the direction of travel of the box;

Fig. 2 is a vertical section through the apparatus along the line a—b of Fig. 1, viewed in the direction of the arrows.

The main shaft 1 of the turning apparatus is supported in bearings in the side parts or frames 2 of the machine. Each frame 2 has a bearing bush carrying a cam disc 3 and extending through the frame to serve as the bearing for the said shaft, and for the purpose hereinafter described. On the main shaft 1, which turns intermittently to the extent of 180° each time, there are secured rails 5, which support, during their rest position, the filled box 4 which is introduced at the top of the apparatus. The shaft 1 has also secured thereon two shields 6 which carry rails 7 adapted to guide the box at its narrow sides, and which rails 7 extend over the narrow sides of the box with an angular flange. To the shield 6 at the right in Fig. 1 flaps 9 for closing the boxes 4 are each attached by means of one double-joint lever 8. These closure flaps 9 have at their longitudinal sides rectangular flanges adapted to extend over the longitudinal walls of the boxes. At that end which is opposite to the point of attachment (at the left in Fig. 1), each closure flap 9 has on its flanges on each side a bolt 10, which bolts are engaged by a device hereinafter described for the opening and closing of the flaps.

The flap 9 which is situated at the top, at the stoppage of the turning apparatus, assumes such a position that the filled box 4 can move into position under its bent-over side edges, until the box is supported upon the rails 5 which engage the bottom of the box close to its foot-pieces 4'. After its introduction the box is lifted in such a way that the flanges of the flap 9 extend over its longitudinal side walls and the box is thus completely closed by the flap. This lifting of the box is effected by the following mechanism.

Upon the main shaft 1 there is secured under each of the two narrow sides of the powder box 4 a guide part 11 carrying two slide rods 12 which support at their ends two cross-rails 13, so that the latter can be moved with the said rods 12 towards and from the bottoms of the boxes. At the center part thereof each rail 13 has a projection which extends through the adjacent shield 6 and carries a roller 14 which runs upon the said cam disc 3 as long as the apparatus is turning. The hub of the said cam disc 3 extends through the frame 2, and at the outside of the frame the hub carries a crank 15, connected to a pull-rod 16 which is moved from any desired point of the machine in such a way that a slight partial rotation is imparted to the cam disc 3 through the medium of the said crank. The lifting contrivance operates as follows:—

The uppermost box 4 is first received by the rails 5, while the rollers 14 rest upon the lowest points of the cam discs 3, so that the foot-pieces 4' of the boxes are free to move over the rails 13 of the lifting device. As soon as the box has come to rest in the turning apparatus the cam discs 3 are turned by means of the pull rod 16, in the opposite direction to that of the arrow of Fig. 2, and to such an extent that the rollers 14 rest upon the high points of the said cam discs. The box 4 is thus raised toward the flap 9 in such a way that the box is received between the lateral flanges of the flap and is completely closed thereby. The shaft 1 is then turned in the direction of the arrow of Fig. 2 to the extent of 180°, so that the filled box is inverted and is brought to the lower part of the apparatus. During this turning of the entire apparatus the said cam discs 3 are partially rotated so as to bring them to their initial position, so that the box 4, previously emptied and again turned upward, is again lowered upon the rails 5 when the partial rotation of the apparatus has been effected, since the rollers 14 corresponding to the box in question rest upon the lowest points in the cam discs 3.

The rails 13 are provided with raised parts 13' which engage between the foot-pieces 4' of the boxes in order to prevent lateral displacement of the box when the latter is again released by the opening of the flap 9 and is no longer held by the lateral flanges of said flap.

The opening of the flap 9 in the inverted state of the box is effected by the following contrivance.

On the shield 6 located at the left in Fig. 1 there are provided guides 17 for two pairs of slide rods 18 and 19. Each of these pairs of rods is connected at one of its ends by means of a cross-bar 18' and 19' respectively, each of which cross-bars carries at its middle a roller 18'' and 19'' respectively. At the ends thereof opposite to the said cross-bars 18' and 19' respectively, the said pairs of rods 18 and 19 carry on each of their individual rods a slotted arm 20 and 20' respectively. The slotted arms 20 of the pair of rods 18 engage the said bolt 10 of the flap 9 located at the top in the apparatus while the slotted arms 20' of the pair of rods 19 engage the bolt 10 of the lower flap 9. The frame 2 at the left side Fig. 1 has secured thereto a member 21 having an endless cam groove in which the rollers 18'' and 19'' of the two pairs of rods 18 and 19 are guided. The said groove is so shaped that during the turning operation the flap 9 of the box which is moving downwardly remains closed until shortly before it reaches its competely inverted position, to open rapidly only at that time, and so that during the succeeding movement the flap 9 of the powder box that is moving upwardly is closed again after the traversing of about three-quarters of the distance.

When a powder box 9 reaches the lowermost part of the apparatus, the powder and the sugar bodies that have been cast in the box are supported upon the flap 9 and after the latter has been opened it forms an obliquely arranged slide constructed of perforated sheet metal, in order that the powder may for the most part pass through the flap which, in being opened, is swung downwardly about one of its narrow sides into such an oblique position that sliding movement of the sugar bodies is still prevented. In order to cause the bodies to glide or move gently from the flap, the latter, as soon as it has been opened, is subjected to a jolting movement. Close below the lowermost extremity of the oblique flap is a conveyor grating 22 which receives the sugar bodies delivered from the flap. Through this conveyor grating or sieve 22 by which the bodies are conveyed out of the machine, a further elimination of the powder may be effected at the same time. The powder falling through the flap 9 as well as that falling through the conveyor 22 is conducted, by means not shown in the drawing, to a point within the machine from which it can be conveniently conveyed for further and immediate utilization for the renewed filling of the emptied powder boxes.

For effecting the said jolting movement of the opened and oblique flap 9 the following mechanism is provided:

In the right-hand frame 2 of the apparatus guides are provided for a pair of slide rods 23 adapted to move in a longitudinal direction. At the interior of the apparatus the said rods 23 are connected by means of a coupling-part 24 and at the exterior of the apparatus the ends of said rods are connected by means of a cross-piece 25. A push-rod 26, actuated from any desired point of the apparatus, is connected to the cross-piece 25 and, during the stoppage of the turning apparatus imparts reciprocating motion to the parts 23, 24, 25. The coupling part 24 has on its upper side a groove which is engaged by the lever 8 of the flap 9 that has at any particular time been brought to the lowermost position, so that this lever 8 and consequently the flap 9 are coupled with the parts 23—26 and participate in their movements. During this jolting motion the flap 9 with its two bolts 10 is guided in the slots of the arms 20 and 20' respectively.

What we claim is:

1. Apparatus for unpowdering sugar bodies contained in a box comprising means for turning the box to an inverted position, a closure flap for the box, and means for manipulating the said flap to form a jolting slide for the delivery of the sugar bodies from said box.

2. Apparatus for unpowdering sugar bodies contained in a box comprising means for turning the box to an inverted position, a perforated closure flap for the box, and means for operating the flap to provide a jolting perforated slide for the delivery of the sugar bodies and the separation of powder therefrom.

3. Apparatus for unpowdering sugar bodies contained in a box comprising means for turning the box to an inverted position, a closure flap for the box, side flanges on said flap, lifting means for moving the box into engagement with said flanges to close the box, and means for opening and jolting the said flap to deliver the sugar bodies after the inverting of the box.

4. Apparatus for unpowdering sugar bodies contained in a box comprising means for turning the box to an inverted position, a closure flap for the box, means for moving the box towards and from the said flap, means for swinging the flap into position to serve as a slide after the inverting of the box, and means for jolting the said slide to cause the delivery of the sugar bodies.

5. Apparatus for unpowdering sugar bodies contained in a box comprising means for turning the box to an inverted position, a perforated closure flap for the box, means for jolting the said flap to deliver the sugar bodies and to separate the powder therefrom, and perforated conveyor means for receiving the said bodies from said jolting flap and for effecting the further separation of the powder from the sugar bodies.

6. Apparatus for unpowdering sugar bodies contained in a box comprising means for turning the box, and holding same stationary in an inverted position, a closure flap for the box, and means for manipulating the said flap to form a jolting oblique slide for the delivery of the sugar bodies.

7. Apparatus for unpowdering sugar bodies contained in a box comprising means for turning and holding the box fixed in an inverted position, a perforated closure flap for the box, and means for operating the flap to provide a jolting oblique slide for the delivery of the sugar bodies and the separation of power therefrom.

8. Apparatus for unpowdering sugar bodies contained in a box comprising means for turning the box through 180 degrees, a closure flap for the box, side flanges on said flap, cam means for moving the box upwardly into engagement with said flanges to close the box, and means for lowering and jolting the said flap to deliver the sugar bodies after the turning of the box.

9. Apparatus for unpowdering sugar bodies contained in a box comprising means for turning the box through 180 degrees to an inverted position, a perforated flap for the box, means for moving the box upwardly towards the said flap before the turning operation, means for swinging the flap downwardly into position to serve as a slide after the inverting of the box, and means for jolting the said slide to cause the delivery of the sugar bodies and the separation of powder therefrom.

10. Apparatus for unpowdering sugar bodies contained in a box comprising means for turning and holding the box in an inverted position, a perforated closure flap for the box, means for swinging the flap downwardly to serve as an oblique slide, means for jolting the said flap to deliver the sugar bodies received from the box and to separate the powder therefrom, and a perforated conveyor for receiving the said bodies from said jolting flap and for effecting the further separation of the powder.

11. Apparatus for unpowdering sugar bodies contained in a box comprising means for turning and holding the box in an inverted position, a closure flap for the box, cam means for moving the box into engagement with said flap before the commencement of the turning movement of the box, means for actuating said cam means to effect said engagement and to restore the cam means to its initial position after the commencement of the said turning movement, and means for manipulating the said flap to serve as a slide for the delivery of the sugar bodies from the stationary box.

12. Apparatus of the character described for the delivery of sugar bodies from their boxes and for the separation of power therefrom, comprising means for the accommodation of two boxes in the apparatus, closure flaps for the boxes, means for moving the boxes into engagement with said flaps, means for moving the closure flap of the lowermost box into position to serve as a slide for the contents of the box, and means for jolting the said slide to cause delivery of the sugar bodies therefrom.

13. Apparatus of the character described for the delivery of sugar bodies from their boxes and for the separation of power therefrom, comprising box carrying and inverting means adapted for the accommodation of two boxes in the apparatus, means for delivering the said bodies from the inverted box, means for jolting said delivery means to cause a smooth movement of the bodies, and conveyor mechanism for receiving the bodies from the jolting delivery means.

14. Apparatus of the character described for the delivery of sugar bodies from their boxes and for the separation of powder therefrom, comprising box carrying and inverting means adapted for the accommodation of two boxes in the apparatus, closure flaps for the boxes, cam means for moving the upright box into engagement with its flap, means for swinging the closure flap of the inverted box into position to serve as an oblique slide for the contents of the box, and means for jolting the said slide to cause delivery of the sugar bodies therefrom.

15. Apparatus of the character described for the delivery of sugar bodies from their boxes and for the separation of powder therefrom, comprising an inverting member for the boxes, closure flaps carried by said member, means for receiving a filled box at the upper part of the member and for raising same into engagement with a closure flap, means for moving the lowermost flap into position to receive the contents of the inverted box, and means for jolting the latter flap to deliver the sugar bodies received from the said inverted box.

16. Apparatus of the character described for the delivery of sugar bodies from their boxes and for the separation of powder therefrom, comprising an inverting member for the boxes, closure flaps carried by said member, means for receiving an upright box in the upper part of the member, means for lifting said box into engagement with one of the flaps, means for swinging a flap out of engagement with the inverted box at the lower part of the said member, and means for jolting the latter flap to serve as a slide for the delivery of the sugar bodies from the inverted box.

17. Apparatus of the character described for the delivery of sugar bodies from their boxes and for the separation of powder therefrom, comprising an inverting member for the boxes, box closure flaps carried by said member, means for receiving an upright box in the upper part of the member, means for lifting said box into engagement with one of the flaps before the inverting operation, means for swinging a flap out of engagement with the inverted box at the lower part of the said member, and means for jolting the latter flap to serve as a slide for the delivery of the sugar bodies from the inverted box.

18. Apparatus of the character described for the delivery of sugar bodies from their boxes and for the separation of powder therefrom, comprising an inverting member for the boxes, perforated plates carried by said member and serving as closure flaps for the boxes, rails for receiving an upright box in the upper part of the member, and means for swinging a closure flap downwardly from an inverted box to receive the contents therefrom, and means for jolting said flap to cause discharge of the sugar bodies therefrom and to cause separation of the powder from such bodies.

19. Apparatus of the character described for the delivery of sugar bodies from their boxes and for the separation of powder therefrom, comprising an inverting member for the boxes, perforated plates carried by said member and serving as closure flaps for the boxes, rails for receiving an upright box in the upper part of the member, cam means for raising the upright box from said rails into engagement with its closure flap, cam mechanism for swinging one of the flaps downwardly into an oblique position to receive the contents of the inverted box, a perforated conveyor for receiving the sugar bodies from the said flap, and means for jolting the flap to cause the said bodies to move onto said conveyor.

In testimony whereof we have signed our names to this specification.

ALFRED WINKLER.
MAX DÜNNEBIER.